US007914205B2

(12) United States Patent
Galli (10) Patent No.: US 7,914,205 B2
(45) Date of Patent: Mar. 29, 2011

(54) PRECISION TEMPERATURE SENSOR (75) Inventor: Giovanni Galli, Saonara (IT)

(73) Assignee: International Rectifier Corporation, El Segundo, CA (US)

( * ) Notice: Subject to any disclaimer, the term of this patent is extended or adjusted under 35 U.S.C. 154(b) by 267 days.

(21) Appl. No.: 12/351,673

(22) Filed: Jan. 9, 2009

(65) Prior Publication Data

US 2009/0207883 A1    Aug. 20, 2009

Related U.S. Application Data

(63) Continuation of application No. 11/724,358, filed on Mar. 15, 2007, now abandoned.

(60) Provisional application No. 60/782,609, filed on Mar. 15, 2006.

(51) Int. Cl.
*G01K 7/01* (2006.01)
*G01K 7/14* (2006.01)

(52) U.S. Cl. ........ 374/178; 374/170; 374/100; 327/513; 702/130

(58) Field of Classification Search .............. 374/1, 170, 374/171, 172, 173, 175, 178, 169; 327/512, 327/513, 262, 378; 702/99, 130–136, 139
See application file for complete search history.

(56) References Cited

U.S. PATENT DOCUMENTS

| 4,101,350 | A | * | 7/1978 | Possley et al. ............... 438/353 |
| 5,200,654 | A | * | 4/1993 | Archer ........................ 327/362 |
| 6,028,472 | A | * | 2/2000 | Nagumo ...................... 327/512 |
| 7,176,701 | B2 | * | 2/2007 | Wachi et al. .................. 324/721 |

* cited by examiner

*Primary Examiner* — Gail Verbitsky
(74) *Attorney, Agent, or Firm* — Farjami & Farjami LLP (57) ABSTRACT

A temperature sensor circuit in accordance with an embodiment of the present invention includes a temperature sensing element operable to provide a temperature voltage that is linearly related to the absolute temperature of the circuit. The temperature sensing element includes a first bi-polar junction transistor and a second bipolar junction transistor connected between a supply voltage and a common ground, wherein the base of first bipolar junction transistor is connected to the base of the second bipolar junction transistor, a first resistor connected between an emitter of the first bipolar junction transistor and the common ground and a second resistor connected between the common ground and a first node, wherein the temperature voltage is provided to the first node across the second resistor. The temperature sensor circuit also includes a current supply element operable to supply a common current to a collector of the first bipolar junction transistor, the second bipolar junction transistor and to the second resistor, respectively, an early voltage element operable to compensate for variations in voltage, a base current element operable to provide a steady base current to the bases of the first and second bipolar junction transistors, a channel modulation element operable to compensate for channel modulation and a leakage element operable to compensate for epi-substrate leakage between the circuit and a substrate on which it is formed.

7 Claims, 15 Drawing Sheets

PRECISION TEMPERATURE SENSOR

CROSS REFERENCE TO RELATED APPLICATION

The present application is a continuation of U.S. patent application Ser. No. 11/724,358, filed Mar. 15, 2007, entitled PRECISION TEMPERATURE SENSOR which claims the benefit of and priority to U.S. Provisional Application No. 60/782,609, filed on Mar. 15, 2006, entitled PRECISION TEMPERATURE SENSOR, the entire contents of each of which are hereby incorporated by reference herein.

BACKGROUND OF THE INVENTION

The present invention relates to a precision temperature sensor circuit that provides an output voltage that is linearly related to the absolute temperature of the circuit. More specifically, the present invention relates to a precision temperature sensor circuit that eliminates the need for trimming.

Monitoring the temperature of IC chips has long been a concern. Naturally, it is preferable, when possible, to incorporate the temperature sensor into the IC. It is common to use Bipolar Junction Transistors (BJT's) in temperature sensing circuits given the known temperature and current dependence of the forward-biased base-emitter junction voltage thereof. Specifically, the temperature can be measured by subtracting two voltages at two different bias currents in a known ratio.

Such temperature sensors make use of the relationship between the BJT's base emitter voltage to its collector current:

$$V_{BE} = \frac{kT}{q} \ln\left(\frac{I_C}{I_S}\right)$$

where k is Boltzmann's constant, T is the absolute temperature and q is the charge of an electron. Is is the transport saturation current of the transistor. This equations presumes a voltage of a few hundred millivolts on the collector and ignores Early effects.

While conventional temperature sensing circuits provide adequate results, they are typically not precise enough unless they are subjected to trimming, for example by an external trimming circuit. Naturally, the addition of such an external trimming circuit adds expense and complexity to the circuit.

Thus, it would be beneficial to provide a temperature sensor circuit that provides high precision and avoids the need for trimming.

SUMMARY OF THE INVENTION

It is an object of the present invention to provide a highly precise temperature sensor circuit in which the voltage is linearly related to the temperature wherein trimming is not necessary.

A temperature sensor circuit in accordance with an embodiment of the present invention includes a temperature sensing element operable to provide a temperature voltage that is linearly related to the absolute temperature of the circuit. The temperature sensing element includes a first bi-polar junction transistor and a second bipolar junction transistor connected between a supply voltage and a common ground, wherein the base of first bipolar junction transistor is connected to the base of the second bipolar junction transistor, a first resistor connected between an emitter of the first bipolar junction transistor and the common ground and a second resistor connected between the common ground and a first node, wherein the temperature voltage is provided to the first node across the second resistor. The temperature sensor circuit also includes a current supply element operable to supply a common current to a collector of the first bipolar junction transistor, the second bipolar junction transistor and to the second resistor, respectively, an early voltage element operable to compensate for variations in voltage, a base current element operable to provide a steady base current to the bases of the first and second bipolar junction transistors, a channel modulation element operable to compensate for channel modulation and a leakage element operable to compensate for epi-substrate leakage between the circuit and a substrate on which it is formed.

Other features and advantages of the present invention will become apparent from the following description of the invention which refers to the accompanying drawings.

DETAILED DESCRIPTION OF PREFERRED EMBODIMENTS OF THE INVENTION

Figure 1:
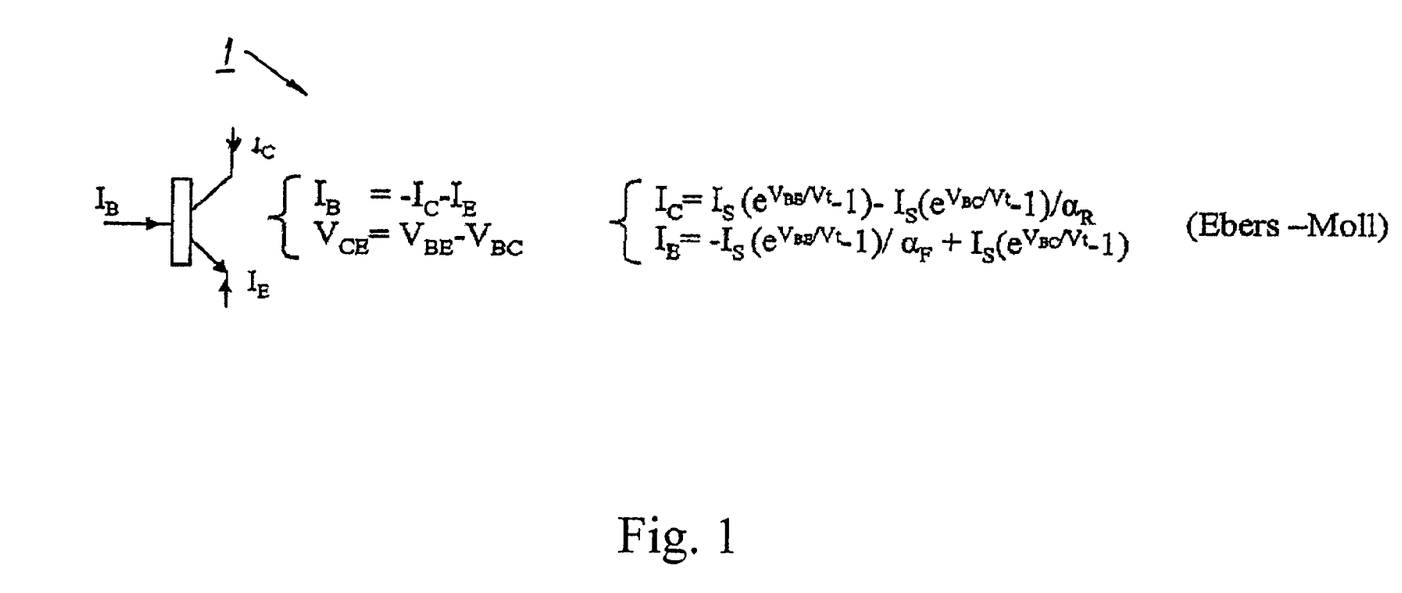
FIG. 1 is an illustration of aan exemplary Bipolar Junction Transistor.

As an initial matter it is useful to review some of the features of the Bi-polar Junction Transistor (BJT). FIG. 1 illustrates an example of a BJT 1. BJT's operate is substantially two regions. In the Active forward region, the collector current $I_C$ is represented by te following equation $I_C = I_S(e^{V_{be}/V_t})$ and the emitter current $I_E = -I_S(e^{V_{be}/V_t})/\alpha_F$ where $I_S$ is the transport saturation current of the BJT and $\alpha_F$ is the large signal forward current gain in common base configuration. $V_t$ is equal to KT/q where K is Boltzmann's constant, T is the absolute temperature in degrees Kelvin and q is the charge of an electron, as is noted above. At room temperature, $V_t$ is approximately 26 mV. In the Active reverse region, $I_E=I_S$ ($e^{Vbc/Vt}$) and $I_B=I_S$ ($e^{Vbe/Vt}$)/$\beta_R$ where $\beta_R=\alpha_R/(1-\alpha_R)$. Thus, the emitter current may be expressed as $I_E=\beta_R I_B$. In general $I_S$ is the transport saturation current and $J_S$ is the transport saturation current density. The other equations illustrated in FIG. 1 are based on or derived from the commonly known Ebers-Moll model of a BJT and thus are not described in further detail.

Figure 2:
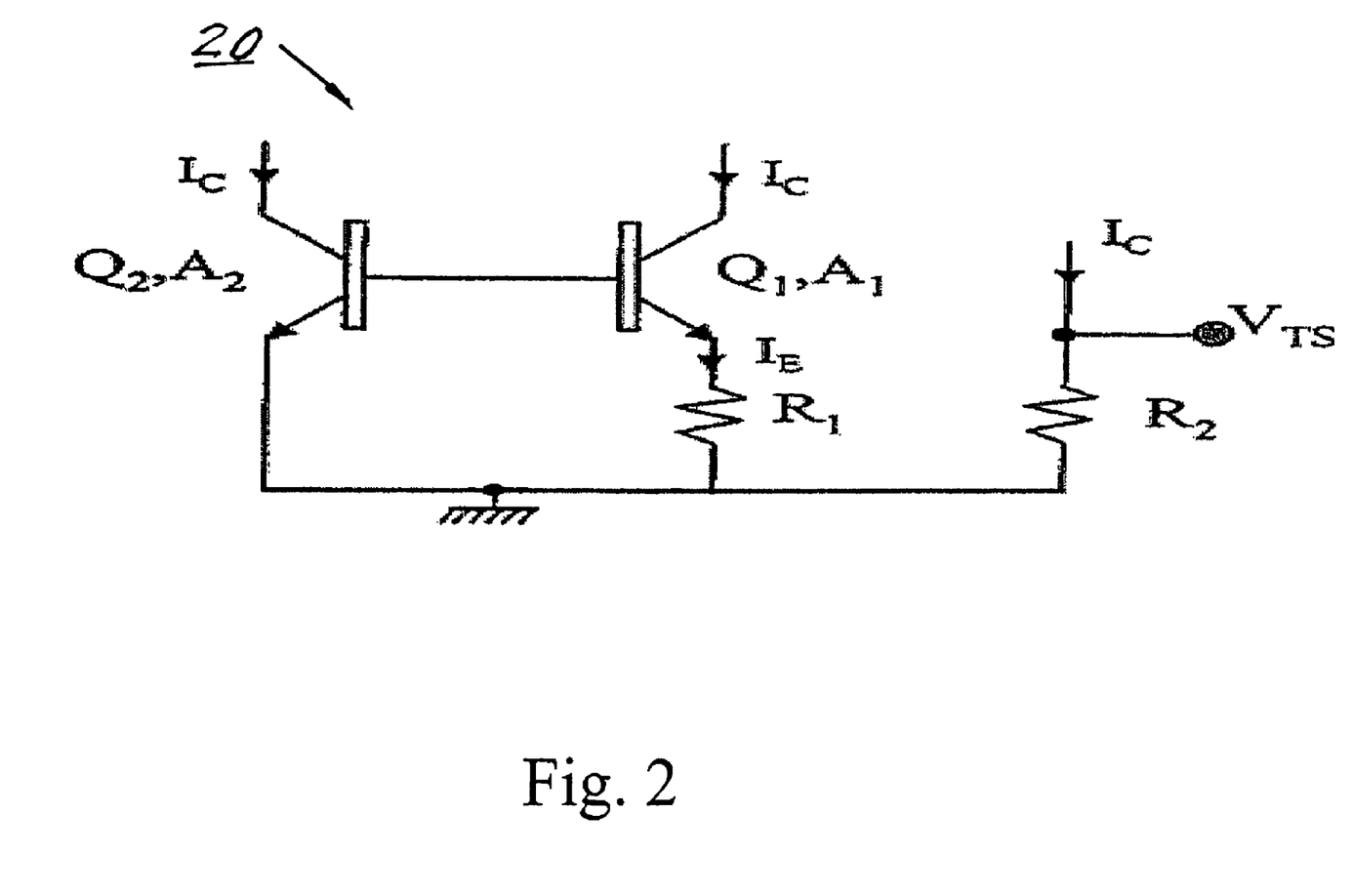
FIG. 2 is an illustration of a basic temperature sensor circuit.

FIG. 2 illustrates a basic temperature sensor circuit 20 that provides a voltage $V_{TS}$ that is linearly related to the ambient temperature. As illustrated, two BJT transistors $Q_1$, $Q_2$ are provided with their base terminals connected to each other. The reference symbol $A_2$ refers to the emitter area of the transistor $Q_2$ and the reference symbol $A_1$ refers to the emitter area of transistor $Q_1$. The collector current $I_C$ is expressed in the following equation:

$$I_C=I_S(e^{Vbe/Vt}); \text{ where}$$

$$V_{be}=V_T \ln I_C/I_S = V_t \ln I_C/J_S A_1$$

In the circuit of FIG. 2, presuming that the same collector current $I_C$ is provided in all three branches, it follows that:

$$V_t \ln I_C/J_S A2 - V_T \ln I_C/J_S A1 = I_E R_1 \text{ and}$$

$$I_C = Vt(\ln A1/A2)/R1 = (KT/q)(lmA1/A2)/R1 \text{ (PTAT urrent)}$$

$$\text{and } V_{TS}=I_C R_2=(KT/q)(\ln A_1/A_2)R_2/R_1=K'T$$

Thus, the temperature voltage $V_{TS}$ is determined by a constant value K' multiplied by the absolute temperature T. Thus, the temperature voltage $V_{TS}$ across resistor $R_2$ may be used to indicate the temperature of the circuit, or die, on which the circuit 20 is formed.

As noted above, the temperature voltage $V_{TS}$ indicates the temperature of the circuit when the current $I_C$ is the same in each branch of the circuit illustrated in FIG. 2. There are several ways to ensure that this is so, for example, a simple current mirror may be provided and connected to the collector of each of the transistors $Q_1$, $Q_2$ and to the node at which $V_{TS}$ is provided.

Figure 3:
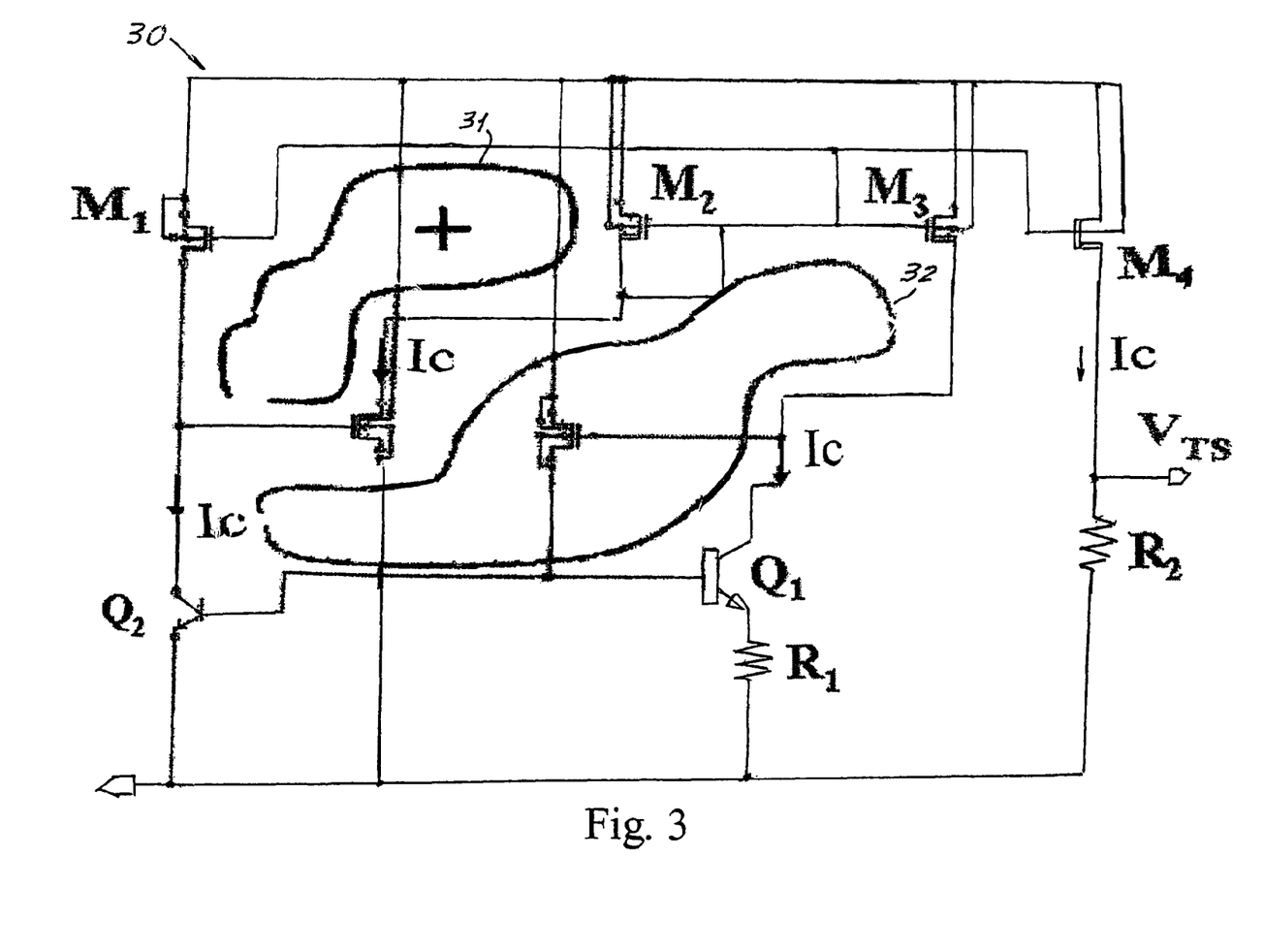
FIG. 3 is an illustration of a temperature sensor circuit in accordance with an embodiment of the present invention.

In FIG. 3, a plurality of MOSFETs $M_1$, $M_2$, $M_3$, $M_4$ are provided to form two current gain loops 31, 32 that ensure that the current $I_C$ supplied to each of the BJTs $Q_1$ and $Q_2$ and provided to the first node, at which the temperature voltage $V_{TS}$ is provided across the resistor $R_2$ is the same. The MOSFETs $M_1$, $M_2$, $M_3$, $M_4$ preferably have substantially the same electrical and physical traits and are interconnected to form the two current gain loops 31, 32. Specifically, the MOSFETs $M_1$, $M_2$ form the positive feedback loop 31 that provides the current $I_C$ to the transistor $Q_2$. The MOSFETs $M_2$, $M_3$ form the negative feedback loop 32 to provide the collector current $I_C$ to the transistor $Q_1$. The MOSFET $M_4$ is used to provide the collector current $I_C$ to the node at which the temperature voltage $V_{TS}$ is provided. The transistors $Q_2$ and $Q_1$ are also selected to be matched such that the emitter area $A_1$ of transistor $Q_1$ is set such that the ratio of the area $A_1$ to the emitter area $A_2$ of the transistor $Q_2$ is 4. Further, the resistors $R_1$ and $R_2$ are selected such that the ratio of $R_2$ to $R_1$ is 20. As illustrated, the circuit of FIG. 3 is substantially similar to that of FIG. 2 with the addition of two gain loops 31, 32. Together, these gain loops form a current supply for the circuit illustrated in FIG. 2.

Figure 4:
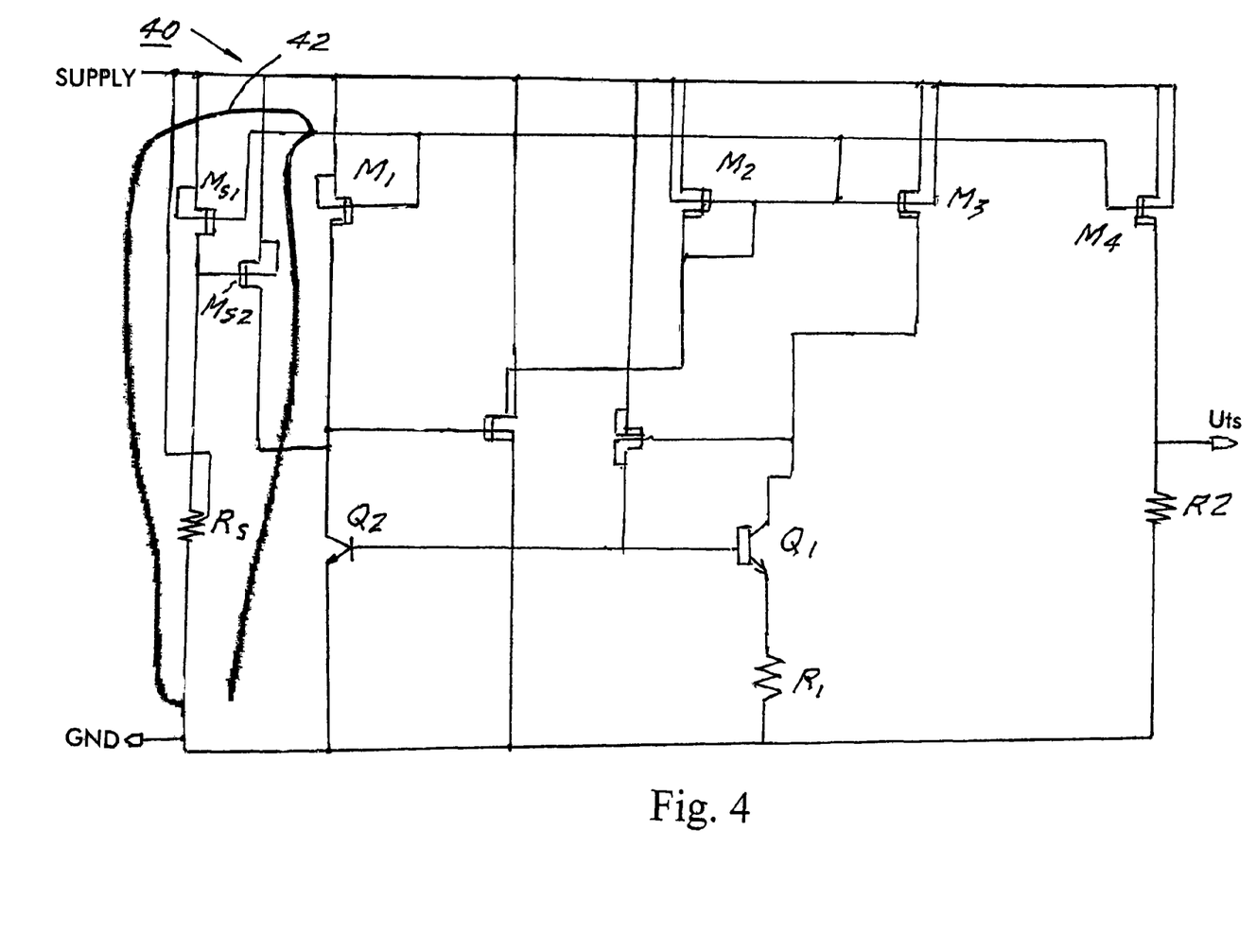
FIG. 4 is an illustration of a temperature sensor circuit in accordance with an embodiment of the present invention including a start up circuit.

FIG. 4 illustrates a temperature sensing circuit 40 similar to that of FIG. 3 that includes a start up circuit 42. The start up circuit 42 allows the circuit to reach a desired operating point and is then disengaged. The circuit includes two MOSFETs $MS_1$, $MS_2$ which allow the collector current $I_C$ to built to a sufficient point prior to disengaging after a period of time.

Figure 5:
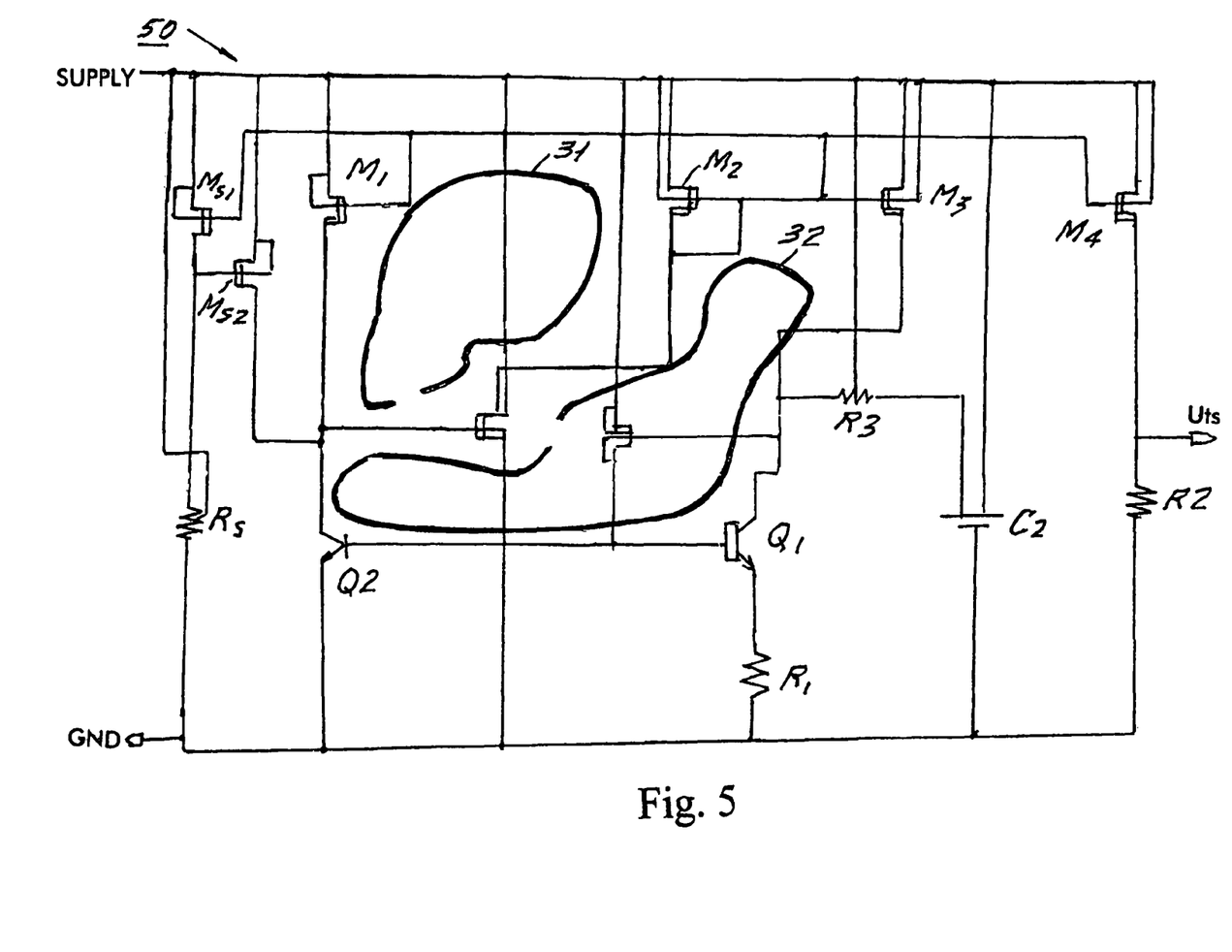
FIG. 5 is an illustration of a temperature sensor circuit in accordance with an embodiment of the present invention including frequency compensation.

FIG. 5 illustrates a temperature sensor circuit 50 similar to that of FIG. 4 that includes frequency compensation for the gain loops 30, 32. The capacitor $C_1$ provides frequency compensation for the positive feedback loop 30. The capacitor C2 and resistor R3 provide frequency compensation for the negative feedback loop 32. Together, these components smooth the effect of frequency variations on the common collector current $I_C$.

In order to avoid the need for trimming, the temperature sensor circuit preferably provides the compensation that would otherwise be provided by the trimming circuit. First, early voltage compensation should be supplied for the Bipolar NPN transistor(s). In addition, base current compensation should be supplied, sometimes referred to as βeta compensation. In addition channel modulation compensation should be provided to the Pmos device(s). The problem of Epi-substrate diode leakage should also be addressed and compensated for. In addition, the circuit should compensate for power supply variations. Finally, random process variation compensation should also be provided.

Figure 6:
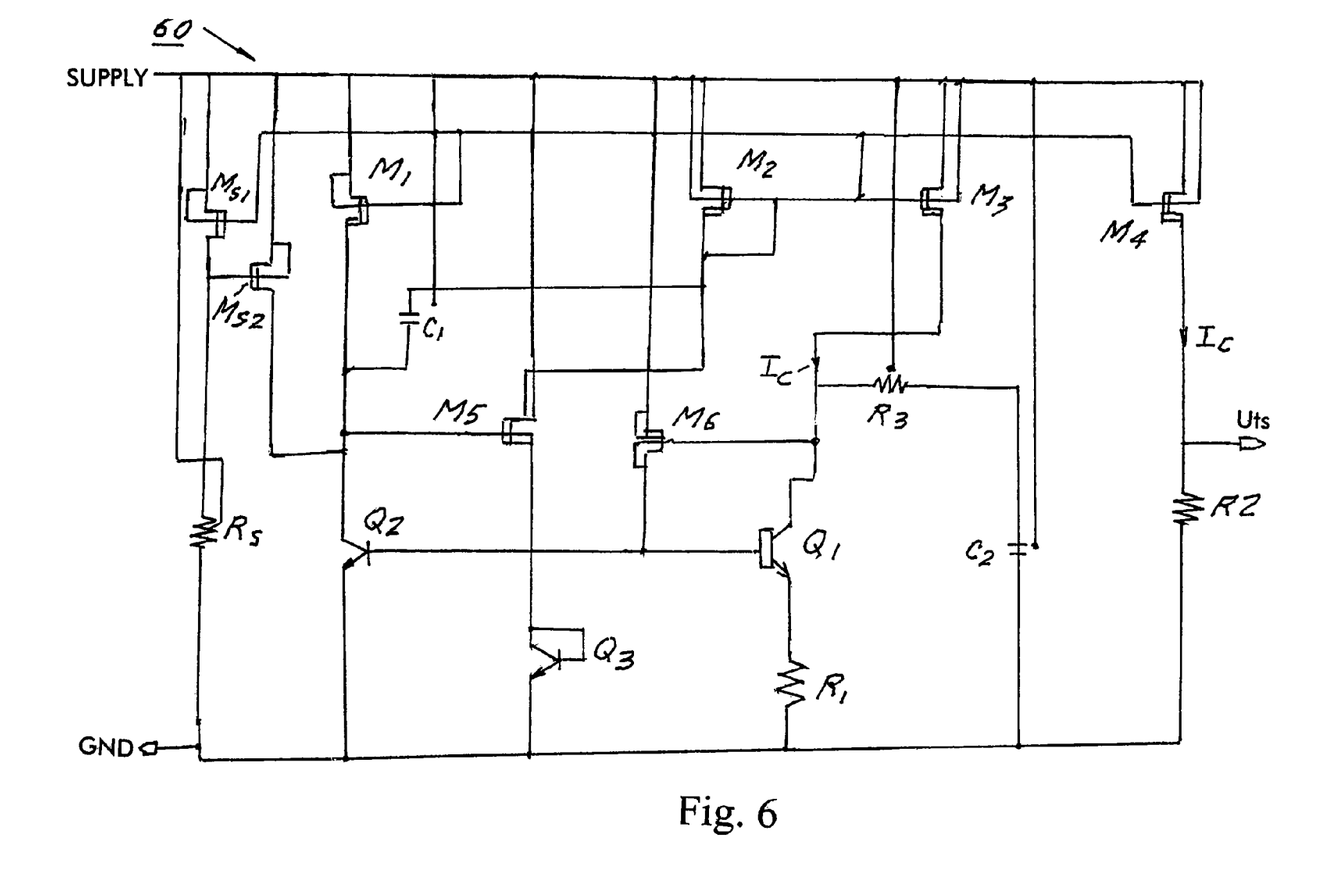
FIG. 6 is an illustration of a temperature sensor circuit in accordance with an embodiment of the present invention including early voltage compensation.

FIG. 6 illustrates a temperature sensing circuit 60 in accordance with the present invention similar to that illustrated in FIG. 5, in which the additional BJT transistor $Q_3$ is highlighted. The transistor $Q_3$ is configured in a diode configuration and allows the transistors $Q_1$ and $Q_2$ to work at the same $V_{CE}$. MOSFET $M_5$ is positioned between the supply voltage and the transistor $Q_3$ with its gate connected to the collector of transistor $Q_2$. MOSFET $M_6$ is connected between the supply voltage and the gate of transistor $Q_1$ with its gate connected to the collector of $Q_2$. The MOSFETS $M_5$ and $M_6$ are provided such that they are properly sized to carry the same $V_{DS}$ voltage. Together these elements provide early voltage compensation.

Figure 7:
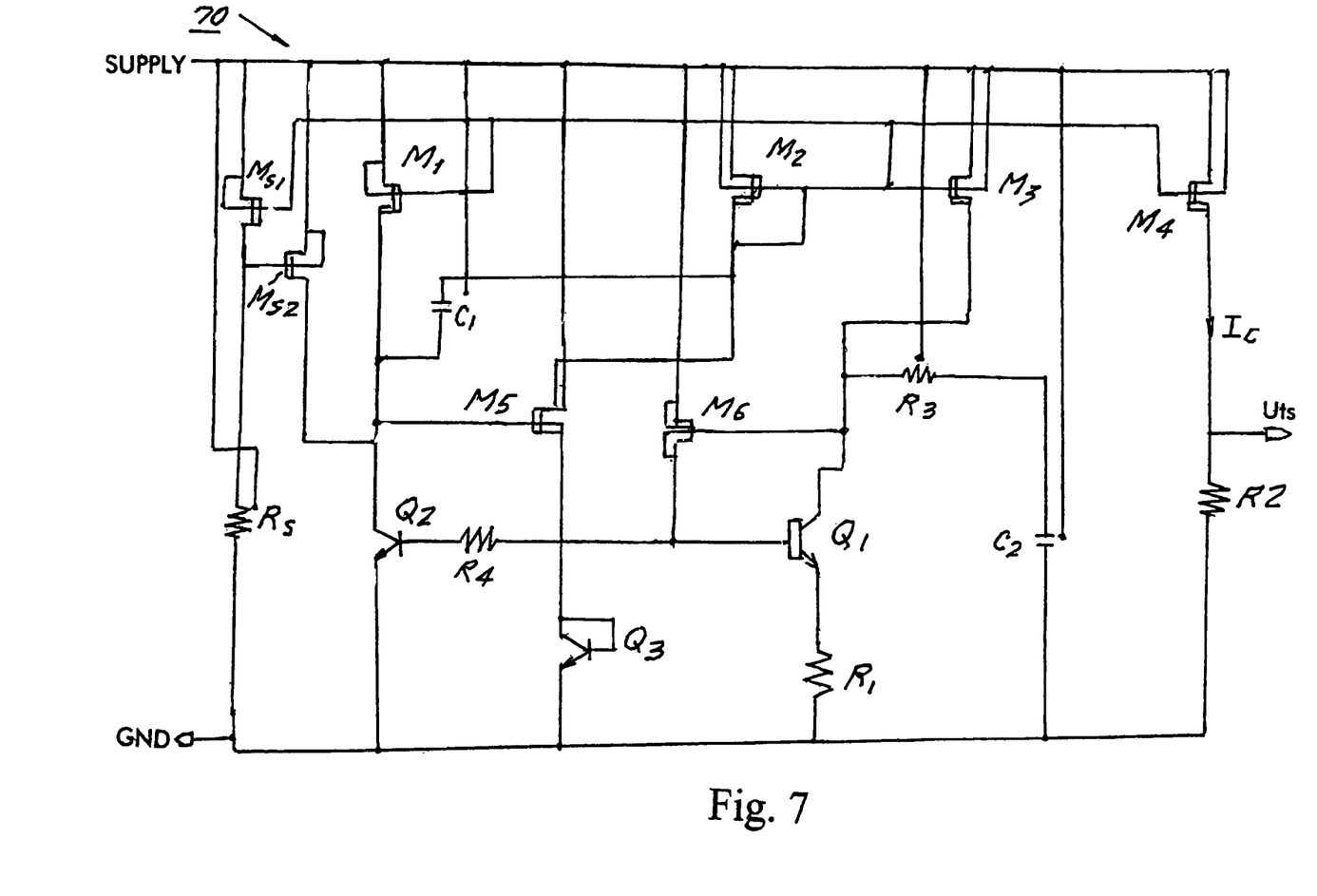
FIG. 7 is an illustration of a temperature sensor circuit in accordance with an embodiment of the present invention base current compensation.

FIG. 7 illustrates a temperature sensing circuit 70 in accordance with an embodiment of the present invention that is similar to that of FIG. 6 except that it provides for base current compensation. As illustrated, the circuit 70 of FIG. 7 includes a resistor $R_4$ positioned between the base terminals of the transistors $Q_1$ and $Q_2$. As a result, the following equations may be used to describe the current $I_C$:

$$V_t \ln I_C/J_S A_2 + I_B R_4 = V_t \ln I_C/J_S A_1 + I_E R_1; \text{ or}$$

$$V_t \ln A_1/A_2 = I_E R_1 - I_B R_4; \text{ where if } R_1=R_4$$

$$V_t \ln A_1/A_2 = (I_E-I_B) R_1; \text{ or}$$

$$I_C=V_t (\ln A_1/A_2) R_1.$$

Thus, the collector current $I_C$ is directly related to the thermal voltage $V_t$ rather than the emitter current $I_E$. This provides for a steadying of the base current.

Figure 8:
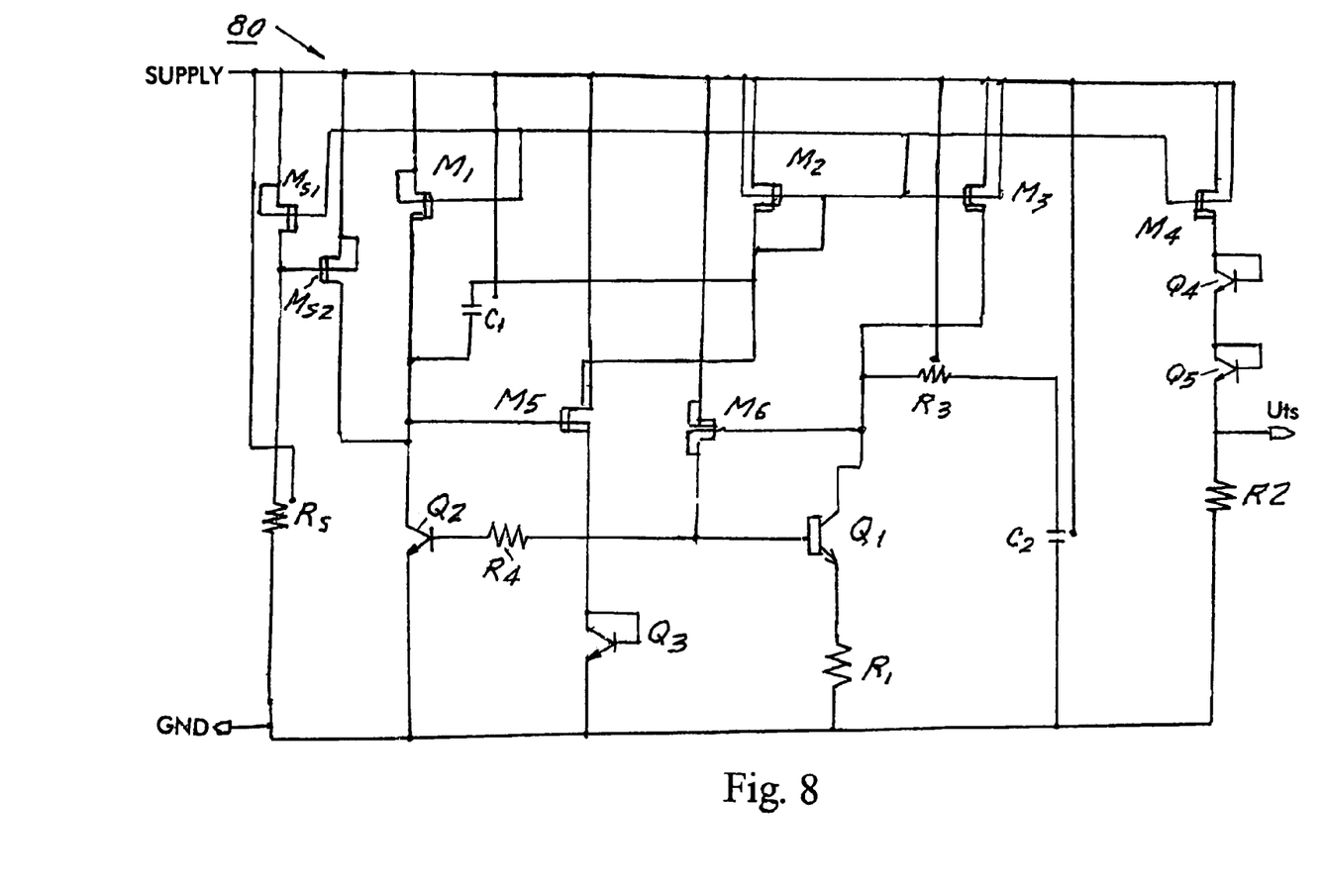
FIG. 8 is an illustration of a temperature sensor circuit in accordance with an embodiment of the present invention connected to a voltage regulator.

FIG. 8 illustrates a temperature sensing circuit 80 in accordance with an embodiment of the present invention that is similar to the circuit of FIG. 7 except that it also provides channel modulation compensation. Two additional transistors $Q_4$ and $Q_5$ are added in a diode configuration between the MOSFET $M_4$ and the node at which the voltage $V_{TS}$ is provided across resistor $R_2$. These two "diodes" ensure that the MOSFETs $M_1$, $M_2$, $M_3$, $M_4$ work at the same $V_{DS}$ voltage.

Figure 9:
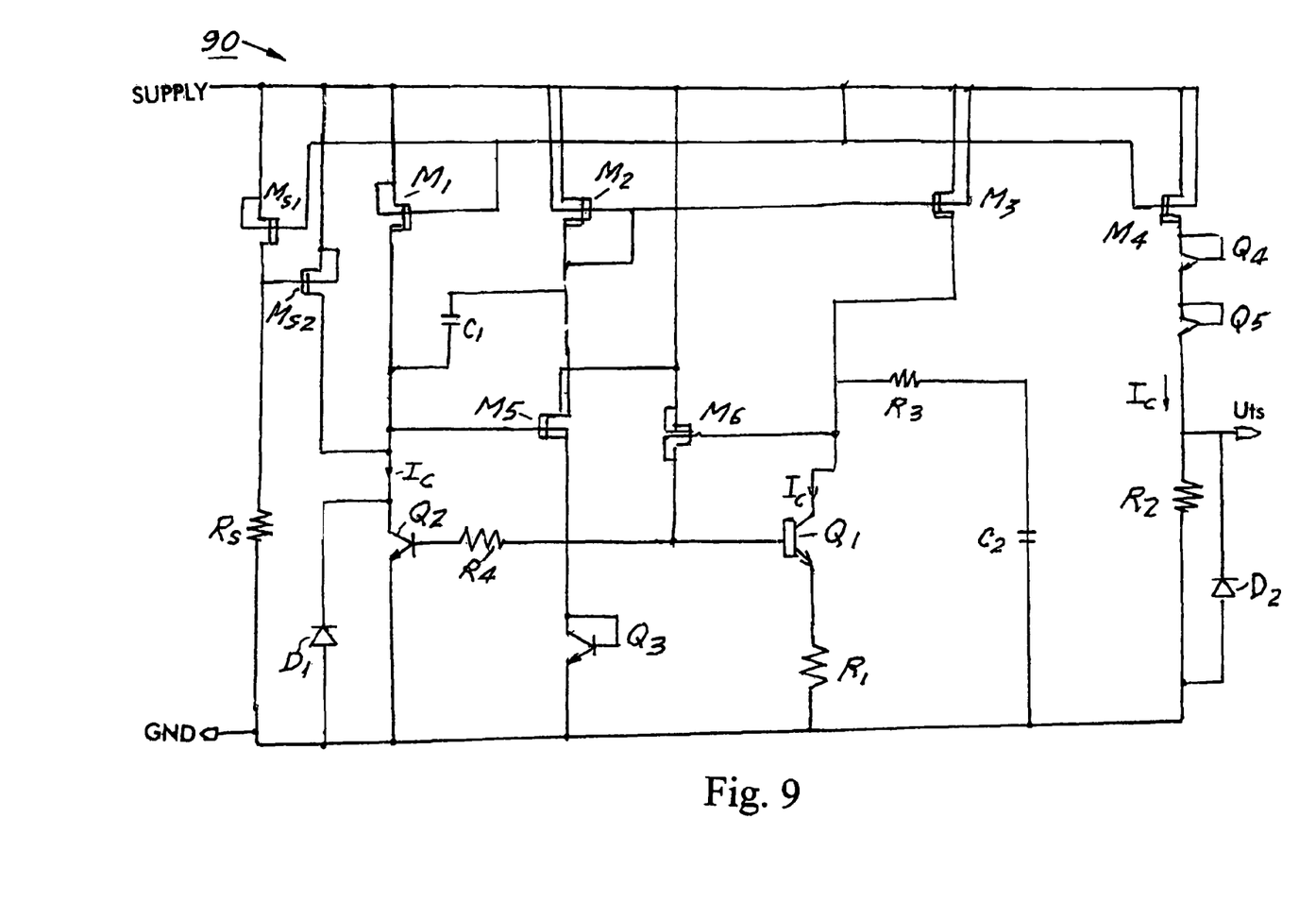
FIG. 9 is an illustration of a temperature sensor circuit in accordance with an embodiment of the present invention including channel modulation compensation.

FIG. 9 illustrates a temperature sensing circuit 90 in accordance with an embodiment of the present invention that is substantially similar to that illustrated in FIG. 8 except that it includes components that provide Epi-substrate leakage compensation. In particular, the circuit of FIG. 9 includes two epitaxial (epi) diodes $D_1$, $D_2$ that add additional Epi-substrate junctions to address Epi-substrate leakage. The diode $D_2$ is positioned across the resistor R2 at the node at which the temperature voltage $V_{TS}$ is obtained. The diode $D_2$ is positioned in parallel with the transistor $Q_2$. In addition, the transistors $Q_4$ and $Q_5$ described with reference to FIG. 8 and acting as diodes may also be configured as epi diodes as well. The additional of these addition epi-substrate junctions provides compensation for epi-substrate leakage.

Figure 10:
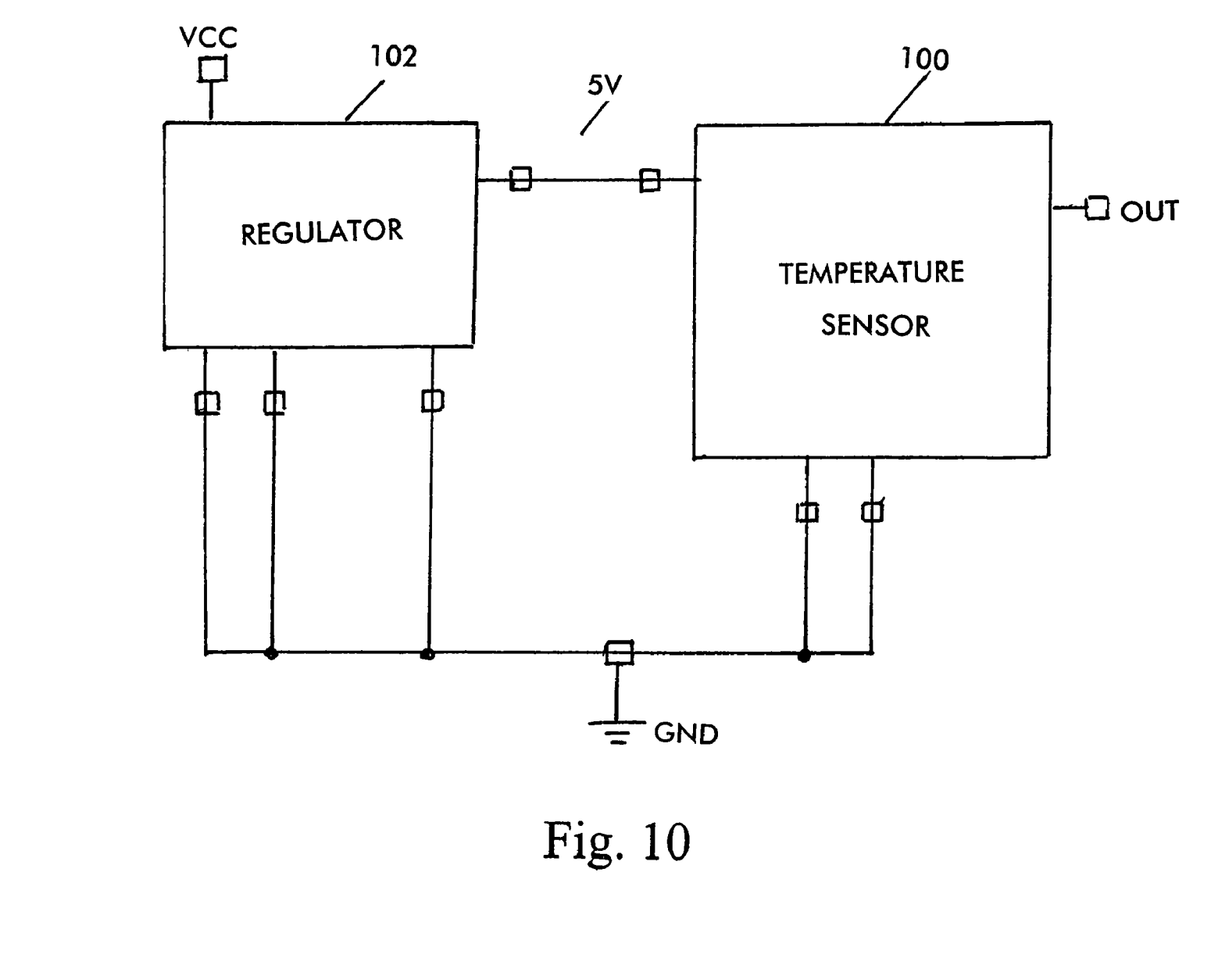
FIG. 10 is an illustration of a temperature sensor circuit in accordance with an embodiment of the present invention including epy-substrate leakage compensation.
Figure 11:
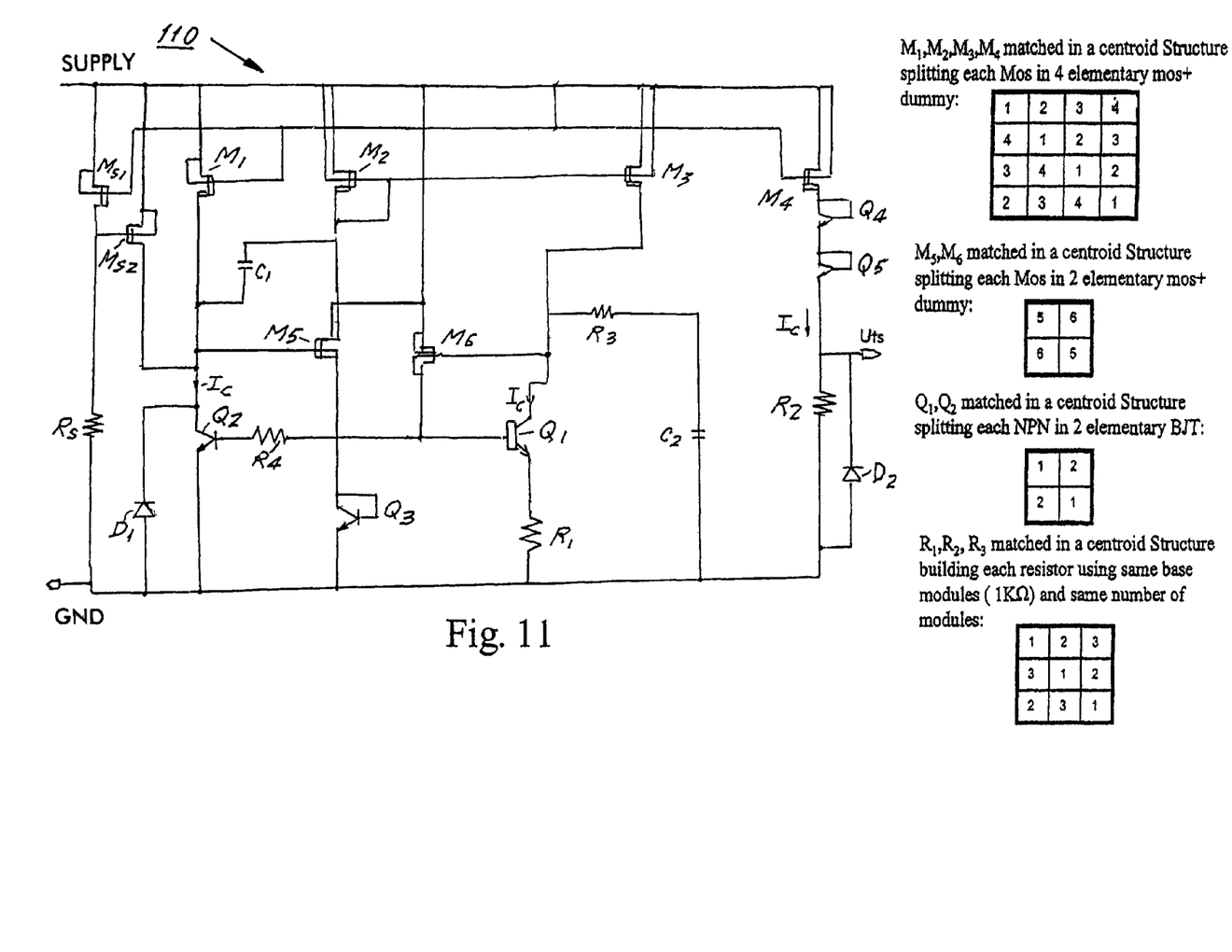
FIG. 11 is an illustration of a temperature sensor circuit in accordance with an embodiment of the present invention including radnom process variation compensation.

FIG. 10 illustrates a temperature sensing circuit 100 in accordance with an embodiment of the present invention connected to a voltage regulator 102. The temperature sensor circuit 100 may be consistent with any of the embodiments described herein with reference to FIGS. 2-9 and 11. The regulator 102 preferably provides a steady 5V supply voltage to improve $V_{CC}$ noise rejection at the output FIG. 11 illustrates a temperature sensing circuit 110 similar to that of FIG. 9, except that it provides compensation for random process variation. In particular, as illustrated in FIG. 10, the MOSFETs $M_1$, $M_2$, $M_3$, $M_4$ are matched in a centroid Structure splitting each MOSFET into four mos+ dummies. Similarly, the MOSFETs $M_5$, $M_6$ are matched in a centroid Structure splitting each MOSFET into 2 elementary Mos+ dummies. The transistors $Q_1$, $Q_2$ are also matched in a centroid Structure splitting each NPN into 2 elementary BJTs. The resistors $R_1$, $R_2$ and $R_3$ are also matched in a centroid Structure building each resistor using the same base modules (for example, 1 kΩ) and the same number of modules. Thus, random variation is minimized in the circuit.

Figure 12:
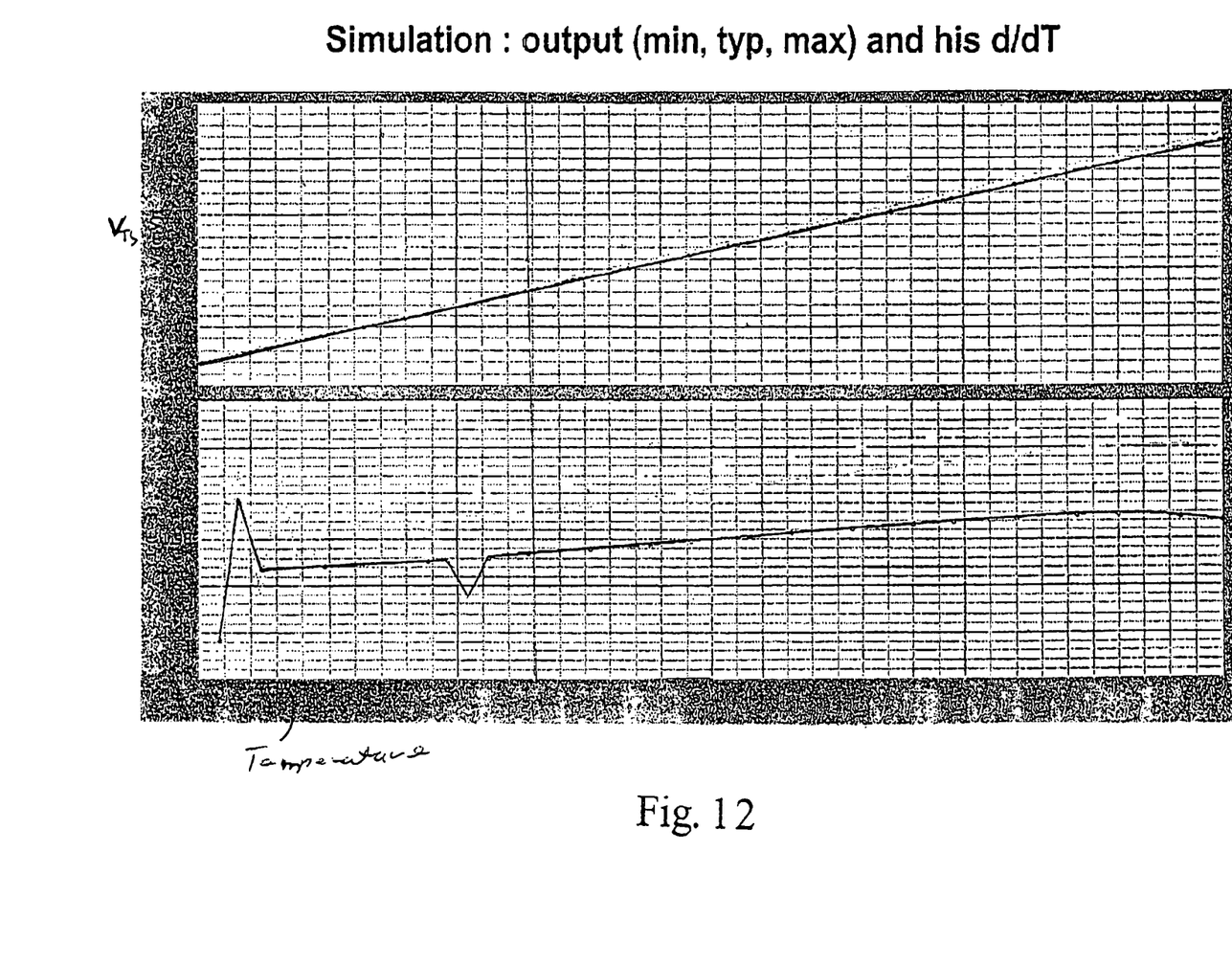
FIG. 12 is a graph illustrating the results of a simulation of the circuit of FIG. 11.

FIG. 12 illustrates graphs that show the results of a simulation of a temperature sensing circuit in accordance with FIG. 11, for example, of the present application. As can be seen in FIG. 12, the voltage $V_{TS}$ rises is a substantially straight line as the temperature rises.

Figure 13:
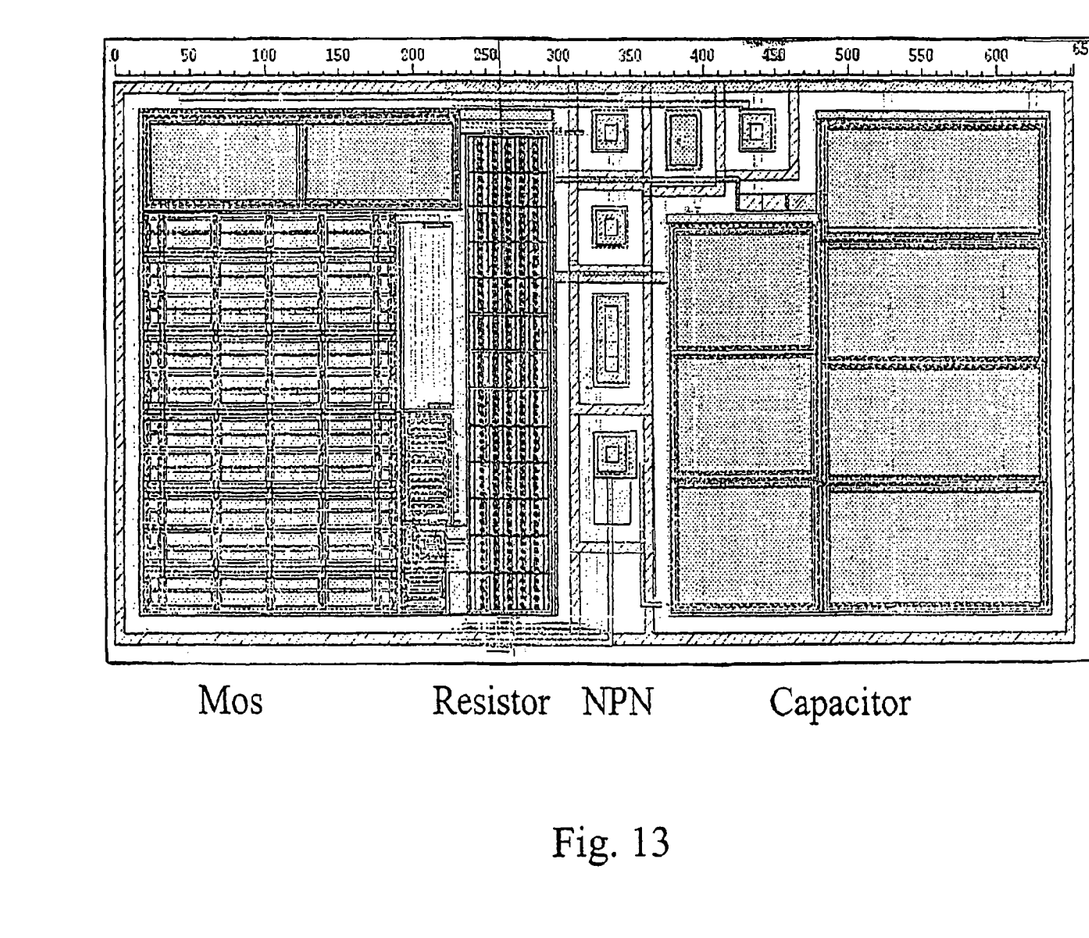
FIG. 13 is an exemplary layout of an integrated circuit used to implement the circuit of FIG. 11.

FIG. 13, illustrates one example of a layout of an Integrated Circuit that may be used to implement the temperature sensing circuit of the present invention. The exemplary layout of FIG. 13 is merely one non-limiting example of an appropriate layout.

Figure 14:
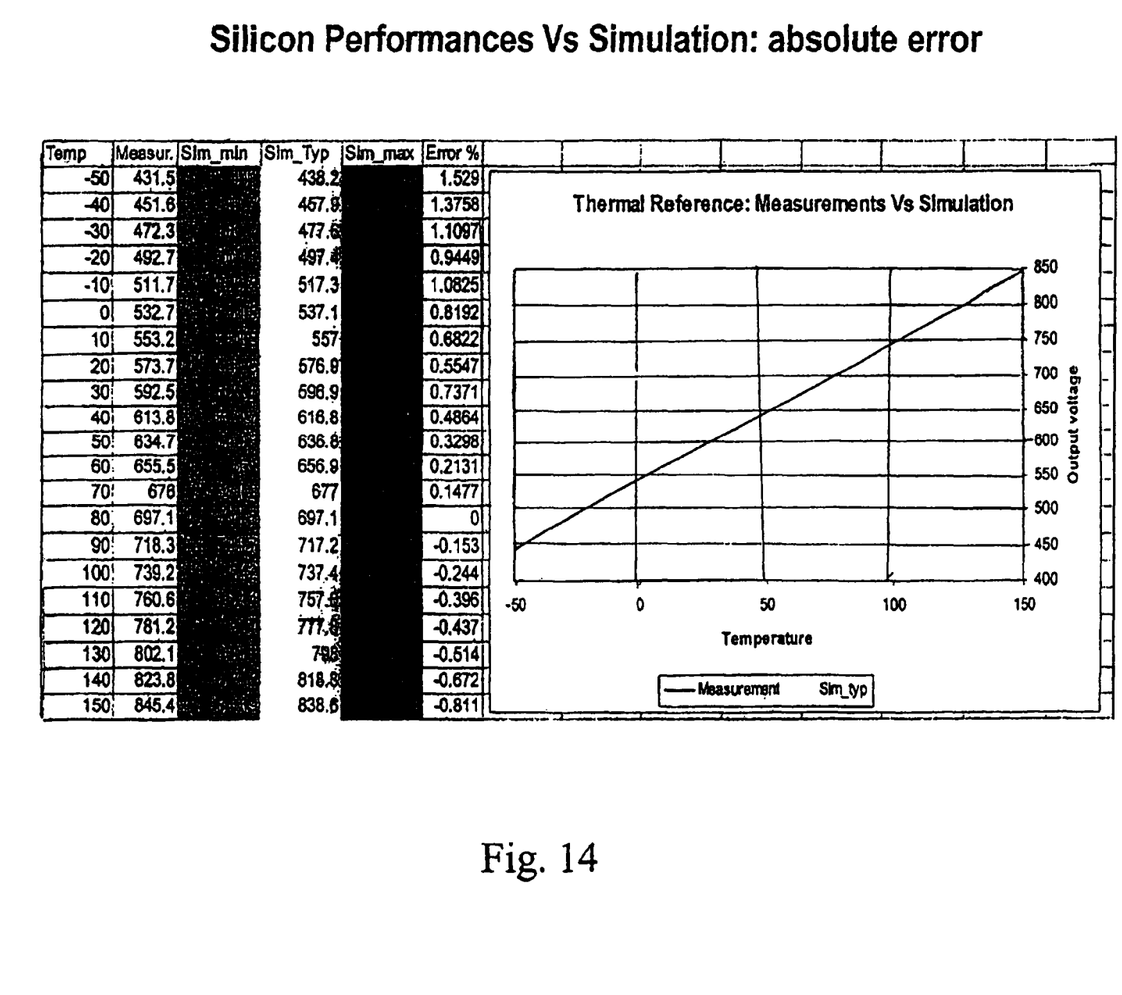
FIG. 14 is an chart including simulated and measured data of the circuit of FIG. 11.

In FIG. 14, the chart illustrates actual measure voltages at the node where the temperature voltage $V_{TS}$ is provided in the column "Measur." and the simulated values ("Sim_min") provided in the simulation mentioned with reference to FIG. 12. The error percentage is also listed. Further, the graph illustrates that the line formed by the actual results is very similar to the line formed by the simulated results of FIG. 12.

Figure 15:
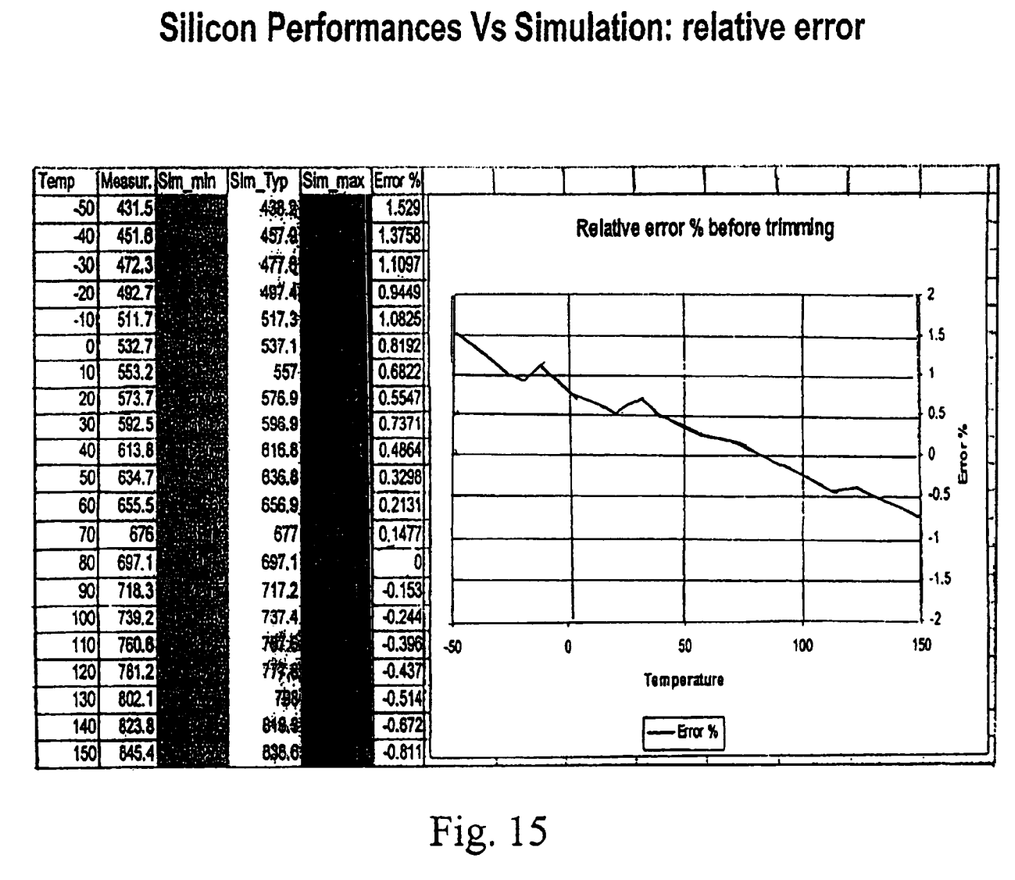
FIG. 15 is another chart including simulated and measured data of the circuit of FIG. 11.

FIG. 15 similarly includes a chart including the actual and simulated temperature voltages $V_{TS}$ and a graph of the error curve showing the difference between them. It is clear based on FIGS. 14 and 15 that the simulated circuit provides results that are substantially the same as the actual results. Further, it is clear based on FIGS. 12 and 14-15 that the temperature sensor of the present invention provides precise temperature measurement based on a temperature voltage $V_{TS}$ that is clearly linearly related to the absolute temperature. Further, the compensation provided in the temperature sensor circuit of the present invention eliminates the need for trimming, such as by an external trimming circuit, thus freeing space and reducing cost.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A temperature sensor circuit comprising:
   a temperature sensing element operable to provide a temperature voltage that is linearly related to the absolute temperature of the circuit, the temperature sensing element comprising:
      a first bi-polar junction transistor and a second bipolar junction transistor connected between a supply voltage and a common ground, wherein the base of first bipolar junction transistor is connected to the base of the second bipolar junction transistor each bipolar junction transistor;
      a first resistor connected between an emitter of the first bipolar junction transistor and the common ground; and
      a second resistor connected between the common ground and a first node, wherein the temperature voltage is provided to the first node across the second resistor;
   a current supply element operable to supply a common current to a collector of the first bipolar junction transistor, the second bipolar junction transistor and the second resistor, respectively;
   an early voltage element operable to compensate for variations in voltage;
   a base current element operable to provide a steady base current to the bases of the first and second bipolar junction transistors;
   a channel modulation element operable to compensate for channel modulation; and
   a leakage element operable to compensate for epi-substrate leakage between the circuit and a substrate on which it is formed.

2. The temperature sensor circuit of claim 1, further comprising a start up circuit operable to ensure that the common current is stable at start up and that is disengaged after a predetermine period of time.

3. The temperature sensor circuit of claim 2, wherein the current supply element further comprises a frequency compensation element operable to compensate for frequency changes in the current supply element such that the common current remains stable.

4. The temperature sensor circuit of claim 3, further comprising:
   a voltage regulator, connected to the temperature sensor circuit and operable to provide a steady supply voltage to the temperature sensor circuit.

5. The temperature sensor circuit of claim 4, wherein the current supply element further comprises:
   a positive feedback gain loop operable to provide the common current to the first bipolar junction transistor; and
   a negative feedback gain loop operable to provide the common current to the second bipolar junction transistor.

6. The temperature sensor circuit of claim 5, wherein the leakage elemement further comprises:
   a first epi diode connected across the second bipolar junction transistor; and
   a second epi diode connected across the second resistor, such that the additional epi-substrate junctions provided in the first and second epi diodes reduces the affect of epi-substrate leakage.

7. The temperature sensor circuit of claim 6, wherein the temperature sensor circuit is implemented in an integrated circuit.

* * * * *